United States Patent
Mayr et al.

(10) Patent No.: US 8,782,894 B2
(45) Date of Patent: Jul. 22, 2014

(54) METHOD FOR PRODUCING AND COMMISSIONING A TRANSMISSION WITH A WATER-BASED LUBRICANT, AND SUCH A LUBRICANT

(75) Inventors: Franz Mayr, Graz (AT); Werner Handl, Altdorf (DE)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 587 days.

(21) Appl. No.: 13/123,432

(22) PCT Filed: Oct. 12, 2009

(86) PCT No.: PCT/EP2009/063296
§ 371 (c)(1),
(2), (4) Date: May 25, 2011

(87) PCT Pub. No.: WO2010/040860
PCT Pub. Date: Apr. 15, 2010

(65) Prior Publication Data
US 2011/0214287 A1 Sep. 8, 2011

(30) Foreign Application Priority Data

Oct. 10, 2008 (DE) .......................... 10 2008 051 264
Jul. 10, 2009 (DE) .......................... 10 2009 032 520

(51) Int. Cl.
*B23P 17/04* (2006.01)
(52) U.S. Cl.
USPC ..................................................... 29/890.09
(58) Field of Classification Search
USPC ................. 29/890.09, 458, 460, 527.2, 527.1; 508/125, 161
See application file for complete search history.

(56) References Cited

U.S. PATENT DOCUMENTS

| 3,719,598 | A | 3/1973 | King |
| 4,409,113 | A | 10/1983 | Bertell |
| 4,755,311 | A | 7/1988 | Burjes et al. |
| 6,194,357 | B1 | 2/2001 | Murata et al. |
| 6,344,517 | B1 | 2/2002 | Quinn et al. |
| 6,372,842 | B1 | 4/2002 | Grisso et al. |
| 2003/0013615 | A1 | 1/2003 | Levy |
| 2005/0145052 | A1 | 7/2005 | Matsuda et al. |
| 2009/0118148 | A1 | 5/2009 | Martin et al. |
| 2009/0277298 | A1 | 11/2009 | Mayr |

FOREIGN PATENT DOCUMENTS

| AT | 009168 | 5/2007 |
| CA | 2644049 A1 | 9/2007 |
| CN | 1171434 A | 1/1998 |

(Continued)

OTHER PUBLICATIONS

Chinese Office Action for 200980144873.7, dated Jan. 5, 2013.

*Primary Examiner* — John C Hong
(74) *Attorney, Agent, or Firm* — Bachman & LaPointe, P.C.

(57) ABSTRACT

A method for producing and commissioning a transmission with a water-based lubricant comprises the following steps. A mixture of a vaporizable liquid, a comminuted solid lubricant and a preserving agent (22) are applied (21) to the finished rotary parts (20) and then dried (23), whereby a coating forms on them. The rotary parts with the coating are installed in the transmission housing and the assembled transmission is filled with a cooling liquid (25), which is primarily essentially water. The transmission is put into operation for the first time (27), wherein the lubricant for the further operation is only formed by abrasion of the rotary parts and distribution of the abraded matter in the cooling liquid. The transmission is then ready for operation (28). Furthermore, a lubricant produced by this method is described.

15 Claims, 2 Drawing Sheets

(56) References Cited

FOREIGN PATENT DOCUMENTS

| | | |
|---|---|---|
| DE | 2007229 | 9/1970 |
| DE | 19854592 | 5/2000 |
| EP | 0078361 | 5/1983 |
| EP | 1007598 | 6/2000 |
| JP | 3-263497 | 11/1991 |
| WO | 97/48783 A1 | 12/1997 |
| WO | 00/43470 | 7/2000 |
| WO | 2004/076601 A1 | 9/2004 |
| WO | 2007/098523 | 9/2007 |

METHOD FOR PRODUCING AND COMMISSIONING A TRANSMISSION WITH A WATER-BASED LUBRICANT, AND SUCH A LUBRICANT

BACKGROUND OF THE INVENTION

The invention relates to a method for producing and commissioning a transmission with a water-based lubricant, wherein the transmission consists of a housing and the rotary parts to be installed in the transmission. Transmissions of this kind are used in the most varied applications, in particular in motor vehicles as shift gearboxes, transfer gearboxes or axle drive gearboxes. The rotary parts are gears, shafts with their gears, couplings, bearing parts and, as the case may be, synchronizer rings. During operation in motor vehicles the power density is particularly high; due to this fact the gears are subject to high loads and sufficient cooling of the transmission requires special attention. Therein the lubricant also acts as a coolant transferring the frictional heat generated in the transmission to the gear housing or conveying it to a separate oil cooler.

WO 2007/098523 A2 by the applicant describes a method for commissioning a transmission, in which the lubricant consisting of water, an anti-freezing agent and a solid lubricant (for example, graphite) is mixed outside the transmission and then filled in the assembled, but still dry, transmission. During the first operation on the testing bench, which is common for high-performance transmissions, the lubricant is distributed in the transmission by the immerging gears. In this way a lubricating film is also formed on the gears. Therein the agitating effect of the gears prevents the lubricant from being demixed.

Tests have shown that in the case of said immersion lubrication during the first operation it takes a certain time until the gears are sufficiently moistened. Until then they run in a dry state, wherein abraded parts are formed, which are detrimental to the service life primarily of the bearings and the seal rings. In the case of pressure circulating lubrication it takes particularly long until the gears are moistened, which is why the method seemed to be less suitable for pressure circulating lubrication. This is a disadvantage because high-performance transmissions are often operated with pressure circulating lubrication. Furthermore it has been found that the coating produced in this way is not very robust and that the agitating effect of the gears under certain operating conditions is not sufficient.

During the manufacture of a transmission, after the mechanical processing of the rotary parts has been completed, they are rubbed with oil or grease and packed to protect them from corrosion in order to be transported at least to another workshop, but in most cases to a transmission manufacturer at a different location. There they are then degreased and finally installed in the housing. These procedures cause considerable labor and plant costs.

Indeed it is known from DE 198 54 592 A and from U.S. Pat. No. 3,719,598 to use rinsing liquids containing boron compounds during the machining of metal parts. In accordance with U.S. Pat. No. 3,719,598 said rinsing liquids also contain fatty acid esters. Rinsing liquids for this totally different purpose almost exclusively serve to carry off heat. They are not allowed to leave any residues on the workpiece.

SUMMARY OF THE INVENTION

The object of the present invention is to remedy the disadvantages of the method according to WO 2007/098523, and to achieve a reduction in the manufacturing costs of the transmission and to provide an improved composition of a lubricating and cooling liquid most suitable for the method of the present invention.

The method sequence already starts with the manufacture of the rotary parts. Due to the fact that the finished rotary parts are not greased, but already at this early stage provided with a protective coating, degreasing of the rotary parts immediately prior to their installation can be omitted. This not only saves costs, but also avoids the use of toxic and/or environmentally harmful solvents. The coating of the mentioned composition becomes especially hard and durable by drying. It does not only constitute an effective preservation during transport, but forms, on the basis of the solid lubricant contained therein together with the cooling liquid filled later into the transmission, the lubricant in a way which remedies the disadvantages of the above-mentioned WO 2007/098523. The coating is not only robust, but also durable for a long time. During operation a balance between the abrasion of the coating and its regeneration is obtained in a coaction of the parts of the solid lubricant contained in the lubricant (in the previous priority application referred to as a filler) and its further components.

The mixture for the coating on the basis of a vaporizable liquid—and not of a toxic and/or environmentally harmful solvent—is applied by spraying, immerging or in another way to the rotary parts and then dried. The vaporizable liquid is water and/or alcohol. Both are environmentally compatible and uncomplicated for the drying plant. Water is especially suitable, even if it vaporizes somewhat more slowly than alcohol, because it does not require recirculation. In the case of the practically used layer thickness on the rotary part and a small proportion of liquid, drying until the liquid is completely vaporized is fast and easy. It can be done, for example, by means of hot air or by means of irradiation with infrared light. Provided with the dried coating, the rotary parts are packed and transported to the place of transmission assembly, or temporarily stored. There they are inserted with the coating into the transmission housing.

Only after the transmission has been completely assembled, it is filled with the cooling liquid, which in the manner according to the invention forms the lubricant together with the coating. The cooling liquid is essentially water, to which, as the case may be, an anti-freezing agent—for example a glycol—and further additives are added.

Before explaining the functionality of the method in more detail, two variants of conducting the method are to be differentiated, depending on the point of time when the chemical anti-corrosion agent or the preserving agent, which comes down to the same thing, is added. Either it is added already to the mixture forming the coating or to the cooling liquid filled in the assembled transmission.

The coating alone already provides good anti-corrosion protection. The plate-shaped or rod-shaped solid lubricants, the parts of which have a very large aspect ratio, i.e. a large ratio of part diameter or part length with respect to part thickness, is deposited on the surface of the rotary part, so that there are very long diffusion paths for corrosively acting materials coming into contact with the coated surface. Thus in the case of the procedure according to the method there is already a physically effective anti-corrosion mechanism, so that the anti-corrosion agent has to be added only to the cooling liquid. Nevertheless, it can be advantageous under certain circumstances to admix the chemically active anti-corrosion agent already to the mixture forming the coating.

In particular in combination with the designated fillers (among other things the solid lubricant) it has shown that, in case a chemically active anti-corrosion agent is added, a coating can be produced which not only has no or only a small number of capillary ducts for gases, such as air, but protects the coated surface also in a chemical manner. It is also advantageous that the anti-corrosion agents are well soluble in water (or aqueous liquids). With this it is also said that the chemical effect of the anti-corrosion agent is the essential effect in the liquid lubricant during the subsequent continuous operation. Accordingly, it is added to the cooling liquid.

After the coated rotary parts have been installed in the transmission and the completely assembled transmission has been filled, the transmission is operated for the first time. Therein at first only the cooling liquid is distributed in the transmission, either by the agitating effect of the gears or by a circulating pump. Since the coating of the gears already contains a solid lubricant, there is no metallic abrasion during this, which usually occurs in the case of dry friction. It is only by the (non-metallic) abrasion of the coating containing the solid lubricant on the rotary parts and by the distribution of the abraded matter in the cooling liquid that the actual lubricant (the water-based lubricant) for the further operation is formed.

At the early stages of the initial operation, the cooling liquid also reaches the seal rings and bearings (normally these are rolling bearings), which are arranged apart from the gears in the housing and at which in this way a lubricating film containing somewhat less solid lubricant is formed. This is advantageous for their service life. This also takes account of the knowledge that different components (gears, bearings, seal rings) have different requirements with respect to the lubricant, which cannot be taken into consideration if lubricating oil is used.

The solid lubricant partly abraded from the rotary parts is in this way suspended or dispersed in the cooling liquid. Thus it is only the abraded matter which turns the cooling liquid into a lubricant. The amount of solid lubricant contained in the coating is to be determined with awareness of the filling capacity of the transmission such that upon termination of the initial operation the concentration determined to be optimal has been reached. Therein the portion of the coating remaining on the rotary part has to be taken into account.

The composition of the liquid lubricant produced in the method of the present invention is described hereinbelow. Within the framework of the invention it is preferred, in order to obtain an anti-corrosion coating which is as dense as possible and has few or essentially no capillary ducts, that the mixture contains a plate-shaped or rod-shaped solid lubricant (in the previous priority application also referred to as filler).

Well suitable solid lubricants are: graphite in different configurations (preferably flaky), molybdenum sulfide, mica, hexagonal boron nitride, tin, PTFE micropowder, talcum, kaolin, iron mica or sulphurized fatty acids having an average particle diameter of, in the case of a plate-shaped configuration, smaller than 15 μm to 7.5 μm, depending on the size, design and tolerances of the components to be coated, because it contributes to their preservation and imparts, in addition to the required lubricating properties, also optimal hardness and service life to the coating. In the case of especially high requirements it amounts to 0.5 to 5.0 μm. In about the same mixing ratio mica powder is suitable, too.

A number of fat-free materials is known as chemical preserving agents and anti-corrosion agents. Especially tried and tested are compounds of boric acid (preferably of a boric acid aminester, in particular a reaction product of boric acid anhydride with triethanolamine), or a carbonic acid salt selected from the group consisting of zinc stearat, calcium stearat, aluminum stearat, zinc oleat, calcium oleat and aluminum oleat. Together with the particles of the solid lubricant both result in an especially robust coating meeting the particular requirements of the method according to the invention. These agents can optionally be added either immediately to the mixture, so that they are contained in the coating, or only subsequently.

In case the transmission is used in the open air, naturally an anti-freezing agent is to be admixed to the cooling liquid. The anti-freezing agent contained in the cooling liquid is a hydrocarbon with at least two hydroxile groups or a substance containing such compounds, practically one of the known anti-freezing agents.

As tensides basically materials can be used which lower the surface tension. Preferably it is an acetylen derivative, in particular acetylen glycol. Acetylen derivatives lower the static as well as the dynamic surface tension and have the advantage to provide good moistening performance without the worry about any toxic or environmentally harmful side effects. The lowered dynamic surface tension secures the exchange, which is essential for the invention, of the solid lubricant between the liquid lubricant and the coating of the gears during the subsequent continuous operation. Beyond that, acetylen derivatives also have an anti-corrosion effect, which is even increased in coaction with the above-mentioned anti-corrosion agents.

In a further development of the invention, still further additives can be provided in the course of the subsequent operation in order to harden the coating and to facilitate its regeneration. Such additives are, individually or in combination: methyl cellulose to further improve the adhesion and the abrasion resistance of the coating during step a) of the method; polyvinyl alcohol, which is water-soluble and therefore well suitable as a thickening agent in step a) of the method or step b) of the method; a polysaccharide as a binding agent. Corresponding to the above explanations, the lubricant according to the invention is altogether free of phosphates, which constitutes another advantage with a view of environmental compatibility.

DETAILED DESCRIPTION

Figure 1:
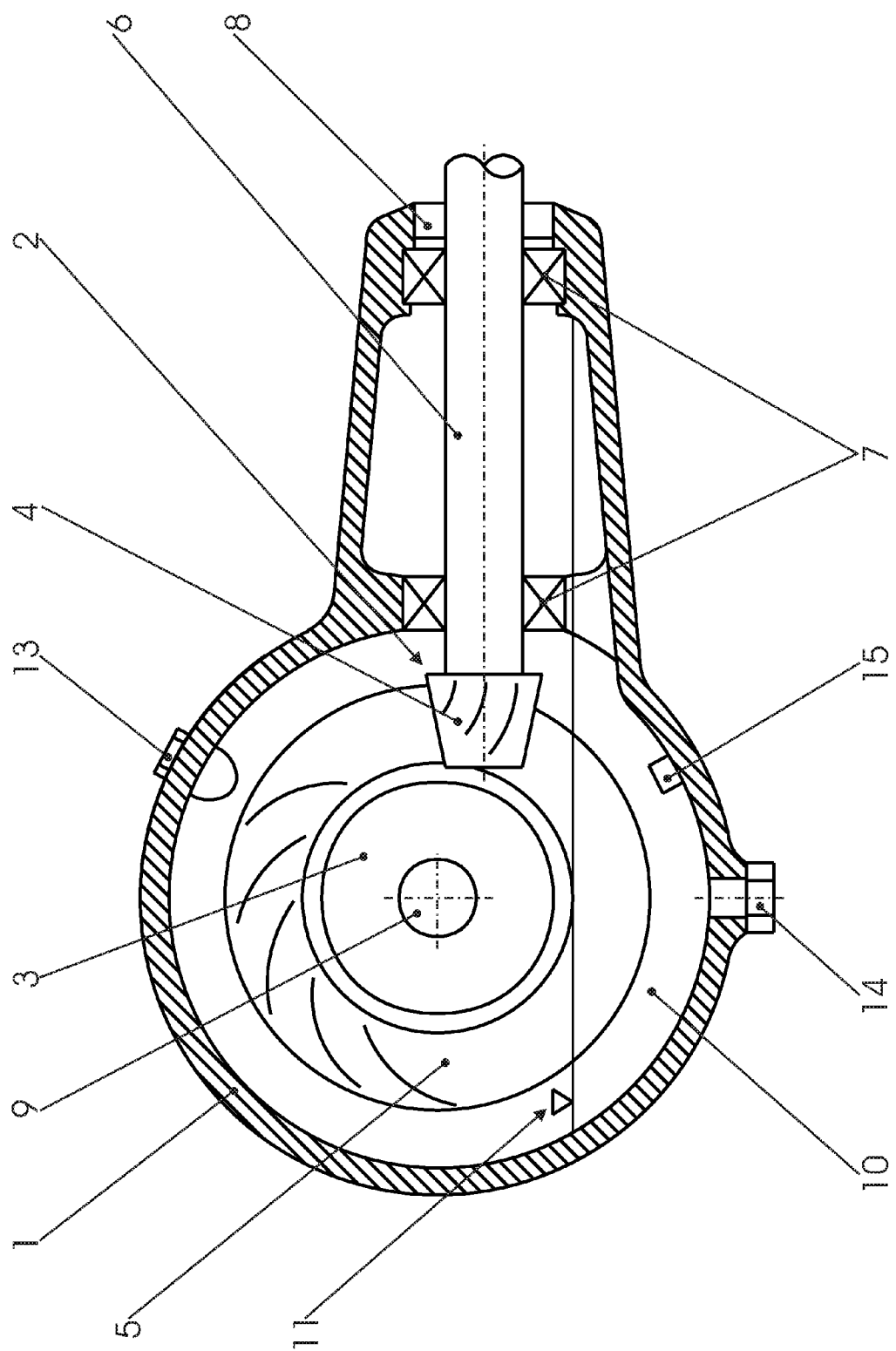
FIG. 1: shows a schematic representation of an exemplary embodiment of a transmission, in which the method according to the invention is used.

The transmission in FIG. 1, the axle drive of a motor vehicle, consists of a housing 1 and a hypoid drive 2 and a differential 3 in its inside. The hypoid drive 2 comprises a pinion 4 sitting on a shaft 6 and a crownwheel 5 surrounding the differential 3. The shaft 6 is lead in bearings 7, the outside of which is joined by a seal ring 8. The differential 3 is of the usual design, thus not shown as an exploded view. Reference numeral 9 designates a halfshaft leading to a wheel. In this case the transmission has two rotary parts: the pinion 4 and the shaft 6 form a first rotary part, the crownwheel 5 and, as the case may be, also parts of the differential, form the second rotary part. Their coating, which in the course of the method according to the invention has been essentially applied over the whole surface, cannot be shown in FIG. 1 due to its small layer thickness.

Figure 2:
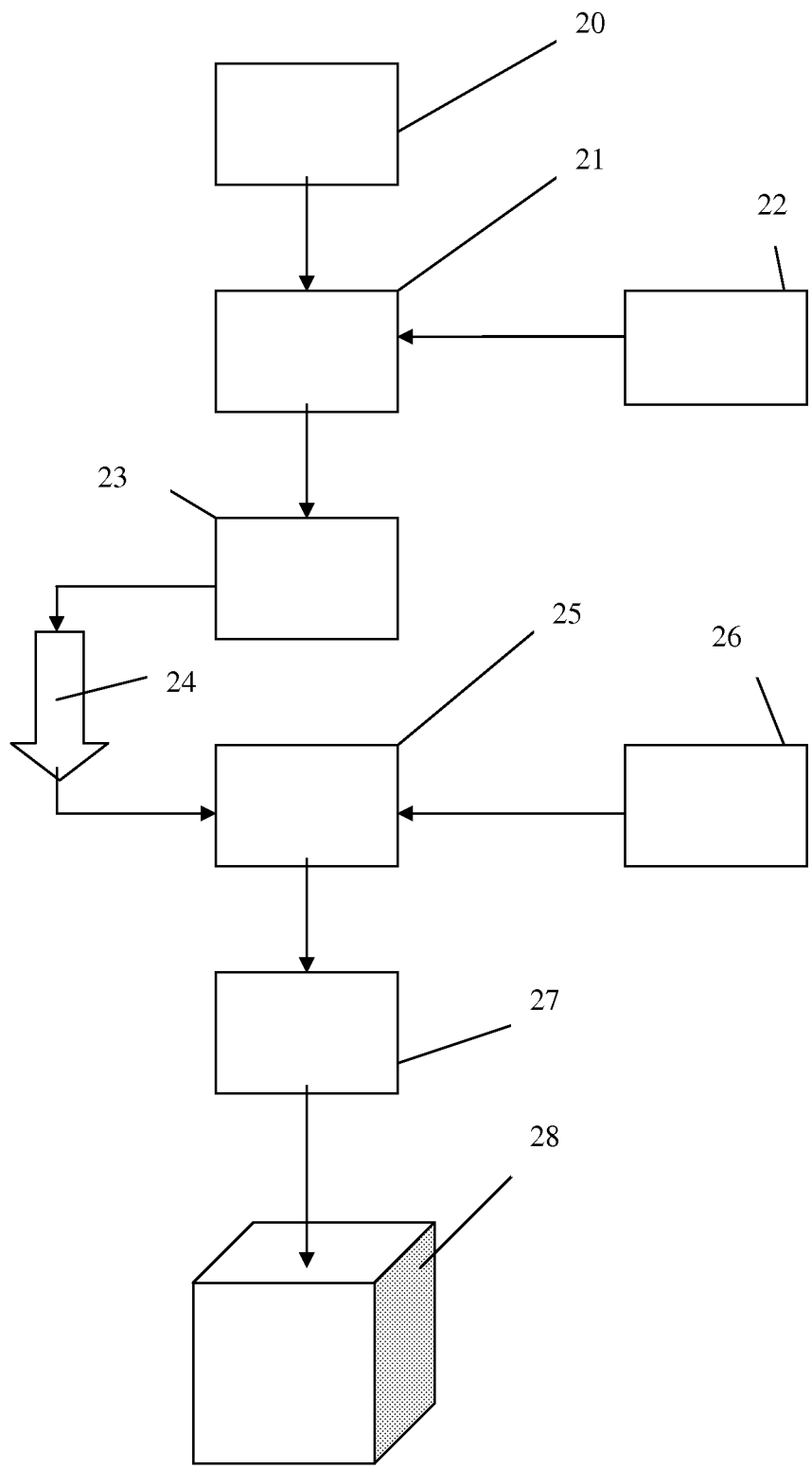
FIG. 2: shows a flow chart relating to the method according to the invention.

The method according to the invention in the first variant according to FIG. 2 starts with the end of the mechanical processing of the rotary parts, box 20. In 21, the finished rotary parts are immerged in a bath containing a mixture of water and/or alcohol or another easily vaporizable liquid, a solid lubricant and a preserving agent=anti-corrosion agent. It would also be possible to apply it in any other way. In 22, this mixture is prepared. Thereafter, in 23, the rotary parts are dried, by means of blowing dry warm air thereon and/or by means of infrared radiation.

The rotary parts provided in this way with a solid coating are packed and stored, or shipped, which is indicated by arrow 24, or immediately taken to the place of transmission assembly 25. There the rotary parts, and further parts of the transmission, are installed and finally the completely assembled transmission is filled with the designated amount of cooling liquid. In 26, the cooling liquid is prepared. It is a mixture which essentially consists of water and an anti-freezing agent.

Now the finished and filled transmission is taken to the testing bench for the test run, which is in any case carried out in the case of high-performance transmissions, here referred to as initial operation, because it is only by this initial operation that the lubricant for the subsequent normal operation is formed in the above-mentioned manner from the cooling liquid and the coating abraded at first between the gears and later also from other areas of the rotary parts. This lubricant on the basis of water can be provided with still further admixtures.

In a variant of the method, no chemical preserving agent is added yet to the mixture intended for coating in box 22, because the solid lubricant, as the case may be, with the aid of a binding agent, provides anti-corrosion protection sufficient for preservation. The chemical preserving agent is filled into the transmission with the coated parts only together with the cooling liquid (essentially comprising 80%, preferably 90%, of water), box 26.

If a tenside is used, it can be admixed to the mixture in step a) as well as to the cooling liquid in step b), preferably in a mixing range resulting in a percentage of 0.1 to 2.0% in the ready-to-operate actual liquid lubricant, which percentage is optimal with a view to effectiveness.

Example 1

In an agitating kettle with a dissolver disk, 90.5 liters of demineralized water are furnished and 0.5 kg of acetylen glycol is added. Then 3.5 kg of methyl cellulose (viscosity 300 mPas 2% Hoeppler) are dissolved therein. Thereafter 2.0 kg of graphite (d50 4.0 µm, 99.5% carbon) and 3.5 kg of a boric acid derivative, produced by a reaction of boric acid anhydride with triethanolamine, are added. Thereafter this mixture is homogenized by means of a disperser. After the homogenization, components made of steel are sprayed with the anti-corrosion agents produced in this way or immersed therein. After the drying, a dense coating is formed, which protects the parts from oxidizing attacks and is well compatible with aqueous lubricant compositions.

Example 2

According to the method of example 1, 92.0 liters of demineralized water are furnished and 2.0 kg of polyvinyl alcohol (fully hydrolized, viscosity 30 mPas 2% Hoeppler) are dissolved as well as 0.5 kg of acetylen glycol is added. Thereafter 2.5 kg of graphite (d50 4.0 µm, and 99.5% carbon) and 2.0 kg of zinc stearat as well as 1.0 kg of a boric acid derivative (produced according to example 1) are added. The anti-corrosion agent produced in this way can be used corresponding to example 1.

Example 3

According to the method of example 1, 90.0 liters of demineralized water are furnished and 0.5 kg of acetylen glycol is added. Then 3.5 kg of methyl cellulose (viscosity 300 mPas 2% Hoeppler) are dissolved therein. Thereafter 2.5 kg of mica powder (d50 2.0 µm) are added and 3.5 kg of a boric acid derivative (produced according to example 1) are dissolved. The anti-corrosion agent produced in this way can be used corresponding to example 1.

The invention claimed is:

1. A method for producing and commissioning a transmission with a water-based lubricant, having an anti-corrosion agent, wherein the transmission consists of a housing (1) and rotary parts (2, 3, 4, 5, 9) supported therein, comprising the following steps:
   a) applying a mixture to the rotary parts (2, 3, 9), wherein the basis of the mixture is a vaporizable liquid and the mixture contains a comminuted solid lubricant, whereafter the mixture is dried, whereby a coating forms on the rotary parts;
   b) installing the rotary parts (2, 3, 9) with the coating in the housing (1) of the transmission to form an assembled transmission in the housing and thereafter filling the housing of the assembled transmission with a cooling liquid (10), which is essentially water; and
   c) putting the transmission into operation for the first time, wherein an actual liquid lubricant for the further operation is formed only by abrasion of the coating on the rotary parts (2, 3, 9) and distribution of the solid lubricant from the abraded coating in the cooling liquid (10).

2. The method according to claim 1, wherein the anti-corrosion agent is added to the cooling liquid according to b).

3. The method according to claim 1, wherein the anti-corrosion agent is added to the mixture according to a).

4. The method according to claim 1, wherein the vaporizable liquid in the mixture according to a) is selected from the group consisting of water, alcohol, a hydroxile group, and mixtures thereof.

5. The method according to claim 1, wherein an anti-freezing agent, comprising a hydrocarbon with at least two hydroxile groups, is contained in the cooling liquid (10) according to c).

6. The method according to claim 1, wherein the liquid lubricant comprises more than 50% water, a solid lubricant, an anti-corrosion agent and a tenside.

7. The method according to claim 6, wherein the solid lubricant is selected from the group consisting of plate-shaped carbon, rod-shaped carbon, boron, hexagonal boron nitride, tin, molybdenum sulfide, PTFE micropowder, mica, iron mica, talcum, kaolin, or a sulphurized fatty acid, and mixtures thereof.

8. The method according to claim 7, wherein the solid lubricant is flaky graphite having a particle size of up to 15 micrometers in a weight ratio of 0.5 to 30% with respect to the lubricant, preferably up to 5%, related to the actual liquid water-based lubricant produced then in step c) of the method.

9. The method according to claim 6, wherein the solid lubricant is mica powder, in a weight ratio of 0.5 up to 30% with respect to the lubricant, preferably up to 5%, related to the actual liquid water-based lubricant produced then in step c) of the method.

10. The method according to claim 6, wherein the anti-corrosion agent comprises a boric acid derivative, consisting of a reaction product of boric acid anhydride with triethanolamine in a weight ratio of 0.5 up to 10% with respect to either the lubricant related to the mixture in step a) of the method or to the actual liquid lubricant produced then in step c) of the method.

11. The method according to claim 6, wherein the anti-corrosion agent comprises a carbonic acid salt selected from the group consisting of zinc stearat, calcium stearat, aluminum stearat, zinc oleat, calcium oleat, aluminum oleat and mixtures thereof.

12. The method according to claim 6, wherein the tenside is acetylen glycol, which is added in a weight ratio of 0.1 up to 2% with respect to the mixture used in step a) of the method.

13. A method according to claim 6, further comprising methyl cellulose.

14. A method according to claim 6, further comprising polyvinyl alcohol.

15. A method according to claim 6, further comprising a polysaccharide as a binding agent, which is added to the mixture used in step a) of the method.

* * * * *